US009832129B1

(12) United States Patent
Jambunathan et al.

(10) Patent No.: US 9,832,129 B1
(45) Date of Patent: Nov. 28, 2017

(54) REDUCING REAUTHORIZATION REQUEST MESSAGES IN COMMUNICATIONS NETWORKS

(71) Applicant: CISCO TECHNOLOGY, INC., San Jose, CA (US)

(72) Inventors: Vasumathy Jambunathan, Bangalore (IN); Kumar Abhinav Singh, Bangalore (IN); Niraj R. Londhe, Littleton, CO (US); Gregory Scott Horlacher, Highlands Ranch, CO (US)

(73) Assignee: Cisco Technology, Inc., San Jose, CA (US)

( * ) Notice: Subject to any disclaimer, the term of this patent is extended or adjusted under 35 U.S.C. 154(b) by 87 days.

(21) Appl. No.: 14/936,463

(22) Filed: Nov. 9, 2015

(51) Int. Cl.
| | | |
|---|---|---|
| *H04L 1/00* | (2006.01) | |
| *H04L 12/26* | (2006.01) | |
| *H04L 12/801* | (2013.01) | |
| *H04L 12/14* | (2006.01) | |

(52) U.S. Cl.
CPC ........ *H04L 47/127* (2013.01); *H04L 12/1407* (2013.01); *H04L 47/11* (2013.01)

(58) Field of Classification Search
CPC ....... H04L 45/125; H04L 12/56; H04L 45/28; H04L 47/11; H04L 45/22; H04L 47/825
See application file for complete search history.

(56) References Cited

U.S. PATENT DOCUMENTS

| | | |
|---|---|---|
| 2013/0231081 A1 | 9/2013 | Mo et al. |
| 2013/0272197 A1 | 10/2013 | Gonzalez et al. |
| 2014/0064072 A1 | 3/2014 | Ludwig |
| 2014/0086052 A1* | 3/2014 | Cai ....................... H04L 47/748 370/235 |
| 2015/0071127 A1* | 3/2015 | Rasanen ................ G06Q 30/00 370/259 |
| 2015/0281465 A1 | 10/2015 | Mo et al. |
| 2015/0296531 A1 | 10/2015 | Xue |

OTHER PUBLICATIONS

UMTS Policy and charging control over Gx reference point (3GPP TS 29.212 version 7.4.0 Release 7), Apr. 2008, 45 pages; http://www.etsi.org/deliver/etsi_ts/129200_129299/129212/07.04.00_60/ts_129212v070400p.pdf.

* cited by examiner

*Primary Examiner* — Yemane Mesfin
*Assistant Examiner* — Abdelillah Elmejjarmi
(74) *Attorney, Agent, or Firm* — Patterson + Sheridan, LLP (57) ABSTRACT

A method is provided in one example embodiment and includes evaluating by a first network node a current level of congestion experienced by a session in a communications network; predicting a level of congestion that will be experienced by the session beginning at a next time boundary; sending a request message to a second network node, the request message comprising at least one rule corresponding to the current level of congestion and the predicted level of congestion, in which the rule has associated therewith an activation time and a deactivation time; and refraining from sending an additional request message to the second network node at the next time boundary.

15 Claims, 8 Drawing Sheets

REDUCING REAUTHORIZATION REQUEST MESSAGES IN COMMUNICATIONS NETWORKS

TECHNICAL FIELD

This disclosure relates in general to the field of communications networks and, more particularly, to techniques for reducing reauthorization request ("RAR") messages in such networks.

BACKGROUND

The application of appropriate policies and rules to be applied for mobile subscribers in a wireless core network is determined by a Policy Charging Rule Function ("PCRF") network node. The PCRF node uses Diameter Gx messaging to communicate rules to be applied at a packet gateway. When a Radio Access Network ("RAN") node experiences congestion (referred to as "RAN congestion"), a RAN operator may configure a different set of rules to be applied for mobile subscribers. Depending upon the level of congestion experienced at the node, the rules to be applied for the mobile subscriber can be changed automatically by provisioning the PCRF network node accordingly. The message used for changing the rules is a Diameter Gx RAR message. As a result, there may be excessive RAR messaging in the network, especially at hour boundaries when rules need to be changed due to a change in network congestion levels.

In some embodiments, the method further includes receiving from the second network node an answer message indicating that the at least one rule has been installed on the second network node. The method may also include determining whether a request update message has been received from the second network node indicating that a revalidation timer maintained at the second network node has timed out; and, if a request update message has been received from the second network node indicating that a revalidation timer maintained at the second network node has timed out, the method may include evaluating a new current level of congestion experienced by the session; predicting a new level of congestion that will be experienced by the session beginning at a next time boundary; sending an answer update message to the second network node, the answer update message comprising at least one new rule corresponding to the new current level of congestion and the new predicted level of congestion, in which the new rule has associated therewith an activation time and a deactivation time; and refraining from sending an additional request message to the second network node at the next time boundary.

In certain embodiments, if the current congestion level and the predicted congestion level are the same, the at least one rule includes a single rule and in which a deactivation time associated with the single rule is two time periods after the activation time thereof. If the current congestion level and the predicted congestion level are different, the at least one rule may include two rules, in which a deactivation time of a first rule of the two rules is the same as an activation time of the second rule of the two rules. The predicting may be accomplished by accessing a database including historical congestion information data for the communications network. The first network node may be a Policy Charging Rule Function ("PCRF") node and the second network node may be a Policy Charging Enforcement Function ("PCEF") node. The at least one rule may be a Policy and Charging Control ("PCC") rule.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes evaluating by a first network node a current level of congestion experienced by a session in a communications network; predicting a level of congestion that will be experienced by the session beginning at a next time boundary; sending a request message to a second network node, the request message comprising at least one rule corresponding to the current level of congestion and the predicted level of congestion, in which the rule has associated therewith an activation time and a deactivation time; and refraining from sending an additional request message to the second network node at the next time boundary.

Example Embodiments

Figure 1:
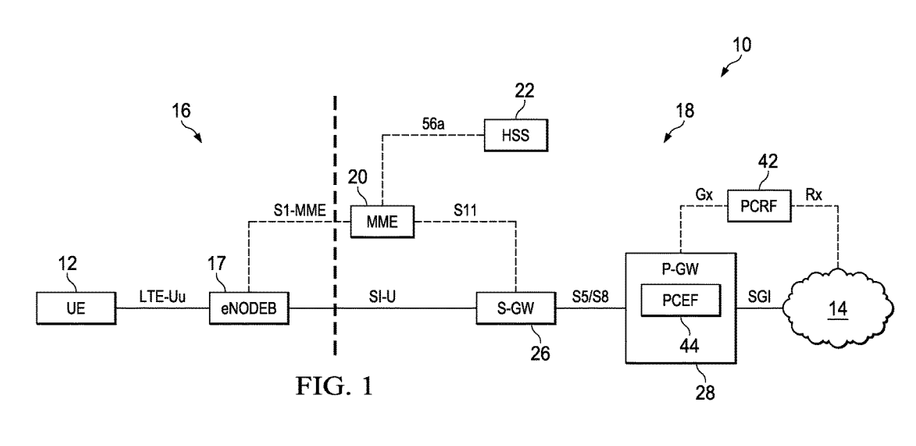
FIG. 1 is a simplified block diagram of a cellular communications environment in which a technique for reducing the number of RAR messages sent in a mobile communications network environment in accordance with embodiments described herein may be implemented.

Referring now to FIG. 1, illustrated therein is a block diagram of a cellular communications system 10 in which a technique for reducing RAR messages may be implemented in accordance with features described herein. According to an embodiment, the system 10 operates to provide services, such as mobile communication sessions, to endpoints, represented in FIG. 1 by user equipment ("UE") 12 communication sessions may refer to active communication between endpoints. The system 10 provides communication services for UE 12 using any suitable cellular protocol and technology. The system 10 may use various cellular protocols and technologies, including but not limited to 3G and 4G protocols and technologies. In one embodiment, at least a portion of the system 10 is implemented as a Long Term Evolution ("LTE") network. Information such as voice, data, text, audio, video, multimedia, control, signaling other information, or any combination of the preceding, may be communicated during a communication session. Such information may be communicated in packets or any other format in accordance with a variety of protocols. A packet may comprise a bundle of data organized in a particular way for transmission and a frame may comprise the payload of one or more packets organized in a specific manner for transmission. A packet-based communication protocol, such as Internet Protocol ("IP"), may be used to communicate the packets.

UE 12 represents any suitable device operable to communicate within a communications network via a wireless link and comprises any suitable arrangement of components operable to form the operations of UE 12, including logic, a user interface, memory, other components, or any suitable combination of the preceding. UE 12 may comprise, for example, a personal digital assistant, a laptop computer, a cellular telephone, a mobile handset, or any other device operable to communicate with system 10. As illustrated in FIG. 1, the system 10 enables UE 12 to be connected to communicate data to and from the Internet 14 via a radio access network ("RAN") 16 comprising a plurality of RAN nodes, represented in FIG. 1 by a RAN node 17, and a core network 18. In one embodiment, the RAN 16 is implemented as an E-UTRAN, in which the RAN nodes comprise eNBs; however, it will be recognized that the RAN 16 may also be implemented using radio network controllers ("RNCs") instead of or in addition to eNBs for the RAN nodes. In one embodiment, the core network 18 may be implemented using an Evolved Packet Core ("EPC") network as defined in 3GPP TS 23.401 and employing a user plane protocol GTPv1-U. It will be understood, however, that other implementations of the core network 18 may be employed in accordance with the features described herein.

As illustrated in FIG. 1, the core network 18 may include a mobility management entity ("MME") 20, which is responsible for control plane functions related to subscriber and session management and is connected to a home subscriber service ("HSS") 22, which supports a database that includes user subscription information, through an S6a interface. The core network 18 may further include a serving GPRS support node ("SGSN") (not shown) connected to the MME 20 via an S3 interface for providing functionality related to packet-data switching. The core network 18 may further include a serving gateway ("SGW") 26, which is the termination point of the user plane interface S1-U toward the RAN network 16, and a PDN gateway ("PGW") 28, which serves as an interface to the Internet, sending user data from the user toward the Internet and receiving data destined for the user from the Internet. In addition, the PGW supports policy enforcement features that apply operator-defined rules for resource allocation and usage, as well as packet filtering and inspection and charging support. The PGW 28 may interface with a policy charging rule function ("PCRF") 42, which manages the service policy and provides QoS information for each user session, via a Policy Charging Enforcement Function ("PCEF") 44. It will be recognized that the core network 18 may provide a variety of functionality in the system 10, including, for example, one or more of aggregation, user authentication, call control and switching, accounting and charging, service invocation, and gateways.

PCRF 42 is the node that determines policy rules in the provider network. PCRF 42 operates at the network core and accesses subscriber databases and other specialized functions, such as a charging system, in a centralized manner. PCRF 42 aggregates information to and from the network, operational support systems, and other sources in real time, supporting the creation of rules and then automatically making policy decisions for each subscriber active on the network. The network may offer multiple services, QoS levels, and charging rules; PCRF 42 provides a network agnostic solution (wire line and wireless) and can also enable a multi-dimensional approach, which helps in creating a lucrative and innovative platform for operators.

PCEF 44 provides policy enforcement as well as charging functionality. Located at the PGW, the PCEF 44 performs the role of traffic controller, distributing appropriate bandwidth as and when required. It also provides QoS, such as service data low detection, at the PGW including varied interactions between online and offline charging. PCEF plays a major role in monitoring service data flow regulated by policy control by allowing the service data to flow through the PGW only upon accessibility of the corresponding gate. PCEF and PCRF enable telecommunications providers to provide differentiated service offerings to increase revenue. PCEF is key to service integrity, which is why service providers ensure validation of PCEF rules before launching a new service offering to validate both service integrity and availability of sufficient bandwidth to deliver the new service offering on demand. Similarly, the provider validates the charging rules per the Service Level Agreement ("SLA") entered into with the customer to ensure that charges are commensurate with the service offering based on service conditions. Every service offering has different bandwidth requirements, which is where the PCEF and PCRF elements come into play; their job is to ensure that network resources are utilized efficiently with minimum waste by ensuring that the required bandwidth is available to each service dynamically in real time.

MME 20 also provides the control plane function for mobility between LTE and 2G/3G access networks, such as GSM Edge Radio Access Network ("GERAN") and Universal Terrestrial Radio Access Network ("UTRAN"), with the S3 interface, terminating at MME 20 from the SGSN.

As previously noted, in one embodiment, the system 10 is implemented in accordance with the Long-Term Evolution ("LTE") standard. E-UTRAN provides the radio access in the LTE network and is designed to improve end-user throughputs and sector capacity and reduce user plan latency, bringing significantly improved user experience with full mobility. With the emergence of IP as the protocol of choice for all types of traffic, LTE provides support for IP-based traffic with end-to-end QoS. E-UTRAN supports various types of services, including web browsing, FTP, video streaming, VoIP, online gaming, real time video, push-to-talk, and push-to-view, for example. UE 12 can be associated with clients, customers, or end users wishing to initiate a communication in communication system 10 via some network. The term "user equipment" is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. UE 12 may also be inclusive of a suitable interface to the human user, such as a microphone, a display, or a keyboard or other terminal equipment. UE 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. On power up, UE 12 can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

It will be recognized that the system 10 includes a plurality of overlapping cells, each corresponding to a respective eNB (such as eNB 17). A cell may comprise any suitable element operable to provide cellular wireless services to UE 12, as well as other mobile devices present in the service area of the cell. Each cell may provide cellular communications service in any suitable configuration and/or geographic area.

A Gx reference point, or interface, located between the PCRF 42 and PCEF 44 is used for provisioning and removing Policy and Charging Control ("PCC") rules from the PCRF to the PCEF and the transmission of traffic plane events from the PCEF to the PCRF. The GX interface may be used for charging control, policy control, or both, by applying Attribute Value Pairs ("AVPs") relevant to the application. The purpose of a PCC rule is to detect a packet belonging to a service data flow, provide applicable charging parameters for a service data flow, and provide policy control for a service data flow. The PCEF 44 selects a PCC rule for each received packet by evaluating the packets against service data flow filters of PCC rules in order of precedence. When a packet matches a filter, the PCC rule for the filter is applied. There are two different types of PCC rules. Dynamic PCC rules are dynamically provisioned by the PCRF to the PCEF via the Gx interface. Dynamic PCC rules may be either predefined or dynamically generated in the PCRF and can be installed, modified, and removed at any time. Predefined PCC rules are preconfigured in the PCEF and may be activated or deactivated by the PCRF at any time.

Figure 2A:
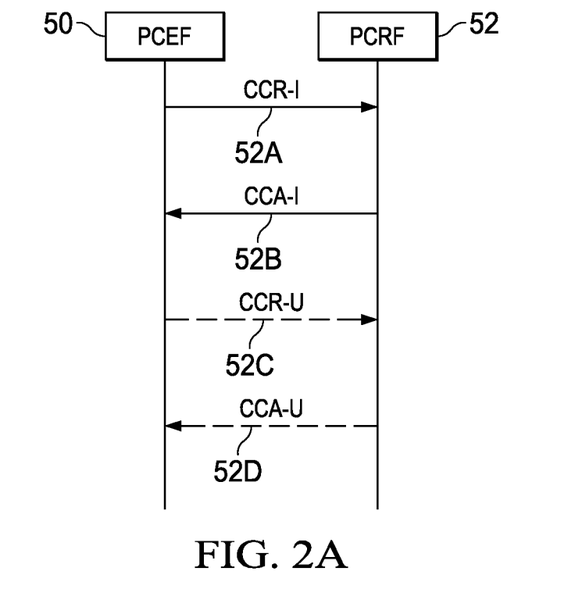
FIG. 2A is a flow diagram illustrating a PULL procedure for requesting and provisioning PCC rules over a Gx interface in accordance with embodiments described herein.
Figure 2B:
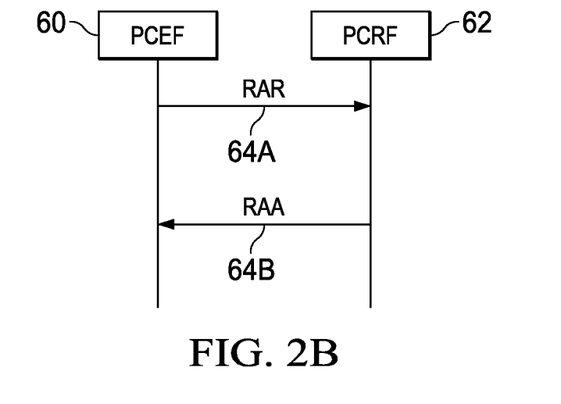
FIG. 2B is a flow diagram illustrating a PUSH procedure for requesting and provisioning PCC rules over a Gx interface in accordance with embodiments described herein.

FIGS. 2A and 2B illustrate a flow diagram for procedures for requesting and provisioning for PCC rules over the Gx interface. In general, the PCRF may indicate via the Gx interface PCC rules to be applied at the PCEF by a PULL procedure (FIG. 2A) or a PUSH procedure (FIG. 2B). Using the PULL procedure (in which provisioning is solicited by the PCEF), in response to a request by the PCEF for PCC rules via Credit Control Request ("CCR") message, the PCRF provisions PCC rules in a Credit Control Answer ("CCA") message to the PCEF. Referring to FIG. 2A, when an event-trigger occurs, a PCEF 50 sends a CCR message ("CCR1"), which carries an event-trigger parameter, to a PCRF 52 requesting the PCRF to deliver PCC rules, as represented in FIG. 2A by an arrow 54A. Upon receipt of the CCR message, the PCRF 52 determines whether to update the PCC rules according to the event-trigger and returns a CCA message ("CCA-I") to the PCEF 50, as represented in FIG. 2A by an arrow 54B. If the rules need to be updated, a returned Credit Control Request-Update ("CCR-U") message containing the updated (or new) PCC rules is sent by the PCEF 50 to the PCRF 52, as represented in FIG. 2A by an arrow 54C, and the PCRF 52 stores both the old PCC rules and the new PCC rules and responds with a Credit Control Answer-Update ("CCA-U") message, as represented in FIG. 2A by an arrow 54D. Upon receiving a CCA message, the PCEF 50 executes the PCC rules. If the returned CCA message carries new PCC rules, the PCEF executes the new PCC rules; if the CCA message carries no new PCC rules, the PCEF executes the old PCC rules.

Referring now to FIG. 2B, using the PUSH procedure, a PCRF may decide to provision PCC rules without receiving a request from a PCEF by including the PCC rules in an RAR message. As illustrated in FIG. 2B, when an event-trigger occurs, a PCRF 60 updates the PCC rules and sends an RAR message to a PCEF 62, represented in FIG. 2B by an arrow 64A. The RAR message carries the new PCC rules; the PCRF 60 does not store the old PCC rules. The PCEF 62 executes the new PCC rules delivered via the RAR message (arrow 64A). Upon completion of execution of the new PCC rules, the PCEF 62 sends a Re-Authorization Answer ("RAA") message to the PCRF 60, as represented in FIG. 2B by an arrow 64B.

Currently, when RAN congestion rules are configured at the PCRF, there is a check at the hour boundary for congestion level change. If the congestion level has changed, an RAR message is sent from the PCRF to the PCEF (as described above with reference to FIG. 2B) in which new rules corresponding to changed congestion level are applied. Consider an example configuration of RAN congestion in which a RAN congestion table includes the following values for a cell for each of the corresponding hours of the day:

10:00—Congestion level=0 (No congestion)
    11:00—Congestion level=1 (Level1 congestion)
    12:00—Congestion level=2 (Level2 congestion)
    13:00—Congestion level=3 (Level3 congestion)

Figure 3:
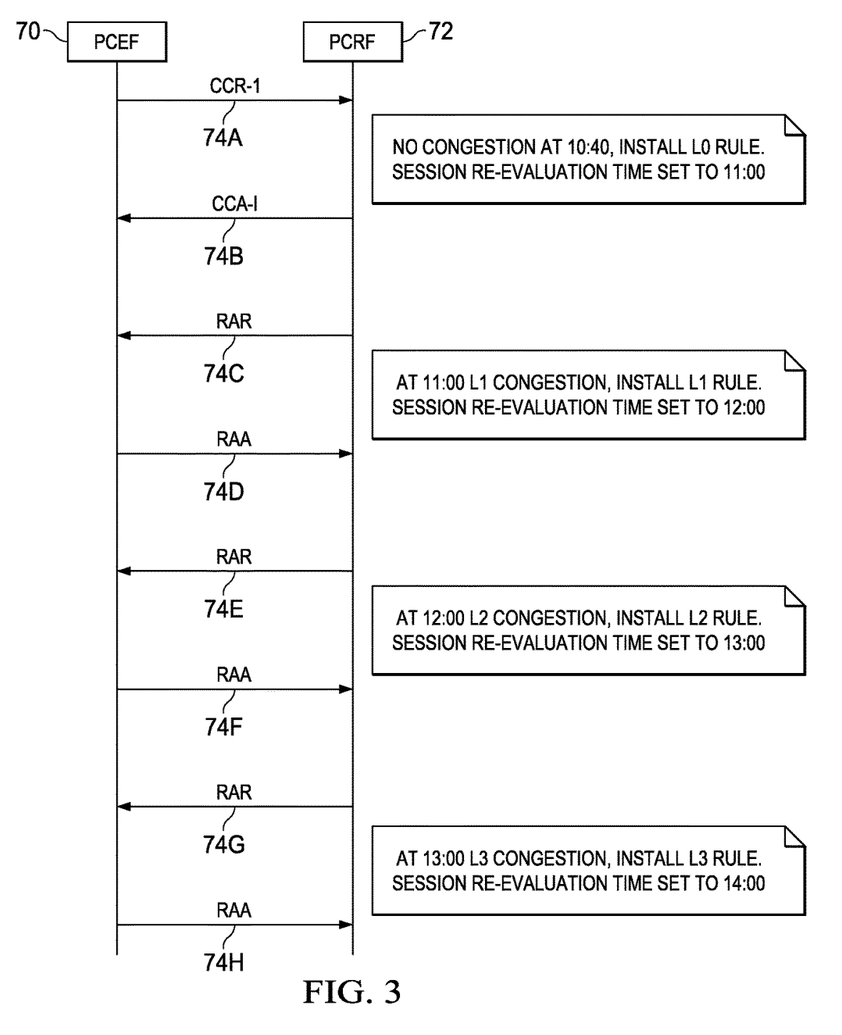
FIG. 3 is a flow diagram illustrating a flow of message over a Gx interface between a PCEF and a PCRF of a mobile communications network environment in a conventional manner.

Assuming the session was established at 10:40, in the above example, an RAR message would be sent for all of the sessions involving the cell at 11:00, 12:00, 13:00, as the congestion level has changed at each of those hour boundaries (0 to 1 at 11:00, 1 to 2 at 12:00, and 2 to 3 at 13:00). FIG. 3 is a flow diagram illustrating the flow of messages between a PCEF 70 and a PCRF 72 to implement the above-noted procedures. In particular, upon creation of the session at 10:40, a CCR message ("CCR-I") is sent from PCEF 70 to PCRF 72, as represented in FIG. 3 by an arrow 74A. Upon determination at the PCRF 72 that there is no congestion, a CCA ("CCA-I") message is returned to PCEF with instructions to install rule L0 (no congestion), as represented in FIG. 3 by an arrow 74B. At the next hour boundary (11:00), PCRF 72 reevaluates the congestion level and determines that level 1 congestion exists. PCRF 72 then sends an RAR message to PCEF 70 instructing PCEF to install rule L1, as represented in FIG. 3 by an arrow 74C.

After installing rule L1, PCEF 70 responds with an RAA message, as represented in FIG. 3 by an arrow 74D. At the next hour boundary (12:00), PCRF 72 again reevaluates the congestion level and determines that level 2 congestion exists. PCRF 72 then sends an RAR message to PCEF 70 instructing PCEF to install rule L2, as represented in FIG. 3 by an arrow 74E. After installing rule L2, PCEF 70 responds with an RAA message, as represented in FIG. 3 by an arrow 74F. At the next hour boundary (13:00), PCRF 72 reevaluates and determines that level 3 congestion exists. PCRF 72 then sends an RAR message to PCEF 70 instructing PCEF to install rule L3, as represented in FIG. 3 by an arrow 74G. After installing rule L3, PCEF 70 responds with an RAA message, as represented in FIG. 3 by an arrow 74H.

Since all sessions at a cell are being reevaluated at applicable hour boundaries, there is a high probability of a large number of RAR messages being generated by the PCRF. In other words, the current technique, as illustrated in FIG. 3, results in an RAR message burst at the hour boundaries.

In accordance with features of embodiments described herein, to prevent an message burst at the hour boundary, configured services for the next hour can be evaluated based on the historic congestion levels for the next hour and rules can be pre-installed, specifying activation/deactivation times, as supported by the Gx reference point as specified in 3GPP TS 29.212 entitled "Universal Mobile Telecommunications System (UMTS); Policy and charging control over Gx reference point" (hereinafter "TS 29.212"). For the current hour, the rule activation time will be the current time and deactivation time will be the next hour. For the next hour rule, the activation time will be the next hour and the deactivation time will be the hour after the next hour. In one embodiment, a database accessible by the PCRF includes congestion levels for each hour of the day based on historical trends of congestion by cell. In one embodiment, congestion levels vary from 0 to 3, although more or fewer levels may be specified.

Similar to the previous example, in which for the indicated hours of the day, the congestion level is as follows:
- 10:00—Congestion level=0 (No congestion)
- 11:00—Congestion level=1 (Level1 congestion)
- 12:00—Congestion level=2 (Level2 congestion)
- 13:00—Congestion level=3 (Level3 congestion)
- 14:00—Congestion level=0 (Level0 congestion)

Figure 4:
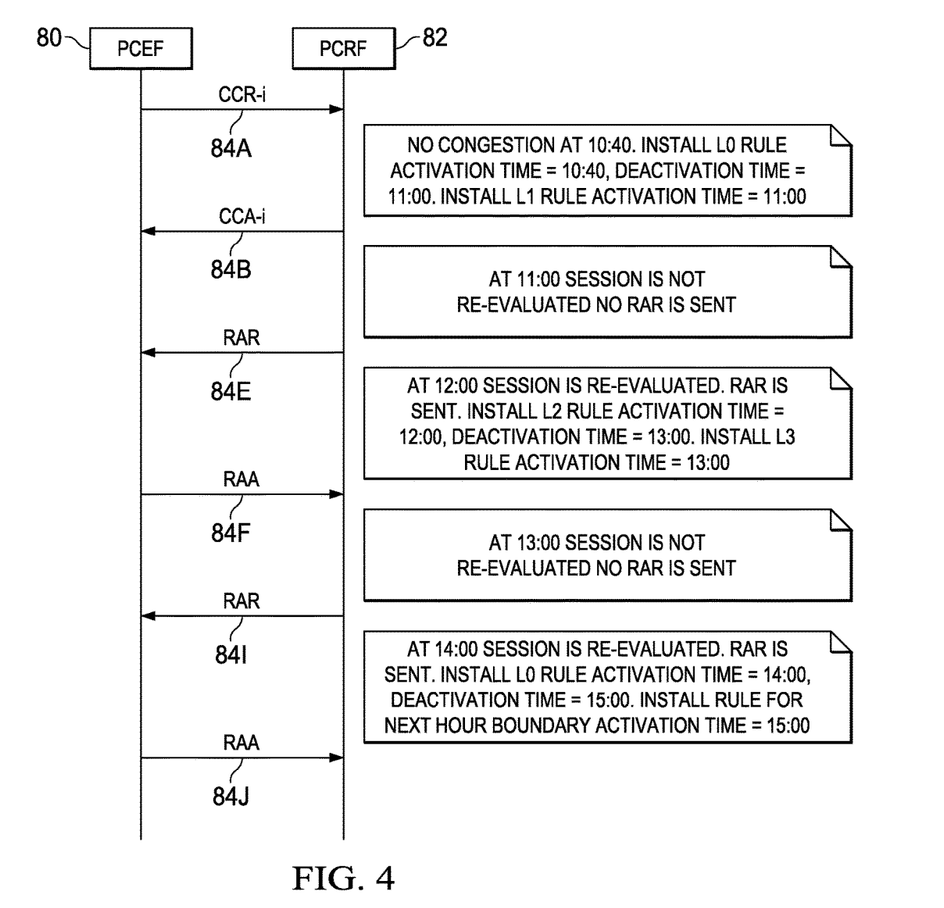
FIG. 4 is a flow diagram illustrating an example flow of messages over a Gx interface between a PCEF and a PCRF in accordance with embodiments described herein to implement a technique for reducing reauthorization request ("RAR") messages in a mobile communications network environment.

FIG. 4 is a flow diagram illustrating the flow of messages between a PCEF 80 and a PCRF 82 in accordance with embodiments described herein to implement a technique for reducing reauthorization request ("RAR") messages in communications networks. Referring to FIG. 4, upon creation of the session at 10:40, a CCR message ("CCR-I") is sent from PCEF 80 to PCRF 82, as represented by an arrow 84A. PCRF 82 evaluates the session and determines that the session is currently experiencing no congestion (level 0 congestion), but that based on historical congestion data for the cell maintained in a database accessible by the PCRF, the session is likely to experience level 1 congestion at the next hour boundary (11:00). As a result of the evaluation, the PCRF 82 returns a CCA ("CCA-I") message to PCEF 80 with instructions to install rule L0 (no congestion) with an activation time of 10:40 and a deactivation time of 11:00 and to install a rule L1 (level 1 congestion) with an activation time of 11:00, as represented in FIG. 4 by an arrow 84B.

At the next hour boundary (11:00), the session is not reevaluated and no RAR message is sent. This is in contrast to the example illustrated in FIG. 3, in which at 11:00 an RAR message is sent from PCRF 72 to PCEF 70, as represented in FIG. 3 by an arrow 74C. At the PCEF 80, rule L0 is deactivated and rule L1 is activated as per the CCA-I message. At the next hour boundary (12:00), PCRF 82 again reevaluates the session and determines that the session is currently experiencing level 2 congestion and that based on historical data maintained in a database accessible by the PCRF, the session is likely to experience level 3 congestion at the next hour boundary (13:00). Once the evaluation is complete, PCRF 82 sends an message to PCEF 80 instructing PCEF to install rule L2 (level 2 congestion) with an activation time of 12:00 and a deactivation time of 13:00, and to install rule L3 (level 3 congestion) with an activation time of 13:00, as represented in FIG. 4 by an arrow 84E. Upon receipt of the message, PCEF 80 deactivates rule L1 and activates rule L2 and responds to PCRF 82 with an RAA message, as represented in FIG. 4 by an arrow 84F. At the next hour boundary (13:00), the session is not reevaluated and no RAR message is sent. This is in contrast to the example illustrated in FIG. 3, in which at 13:00 an RAR message is sent from PCRF 72 to PCEF 70, as represented in FIG. 3 by an arrow 74G. At the PCEF 80, rule L2 is deactivated and rule L3 is activated.

At the next hour boundary (14:00), PCRF 82 again reevaluates the session and determines that the session is currently experiencing level 0 congestion and also evaluates congestion levels that might be applicable to the next hour boundary (15:00) based on historical data maintained in a database accessible by the PCRF. Once the evaluation is complete, PCRF 82 sends an RAR message to PCEF 80 instructing PCEF to install rule L0 (level 20 congestion) with an activation time of 14:00 and a deactivation time of 15:00, and to install any applicable rules for the following hour with an activation time of 15:00, as represented in FIG. 4 by an arrow 84I. Upon receipt of the RAR message, PCEF 80 deactivates rule L3 and activates rule L0 and responds to PCRF 82 with an RAA message, as represented in FIG. 4 by an arrow 84J.

It will be noted that although "hour boundaries" are described and utilized herein, other time boundaries (e.g., two hours, 15 minutes, 30 minutes, etc.) may also be employed as desired or dictated by industry standards without negatively impacting or requiring significant modification to embodiments described herein.

In one embodiment, it will be assumed that a revalidation timeout may be implemented at the PCEF. In this embodiment, upon expiry of a revalidation timer for implementing the revalidation timeout, the PCEF sends a CCR-U message to the PCRF. In response to receipt of the CCR-U message, the PCRF evaluates the predicted congestion level at the next hour boundary and responds with a CCA-U message instructing PCEF to install the rule for the next hour with an activation time of the next hour boundary and a deactivation time of the following hour boundary.

Figure 5:
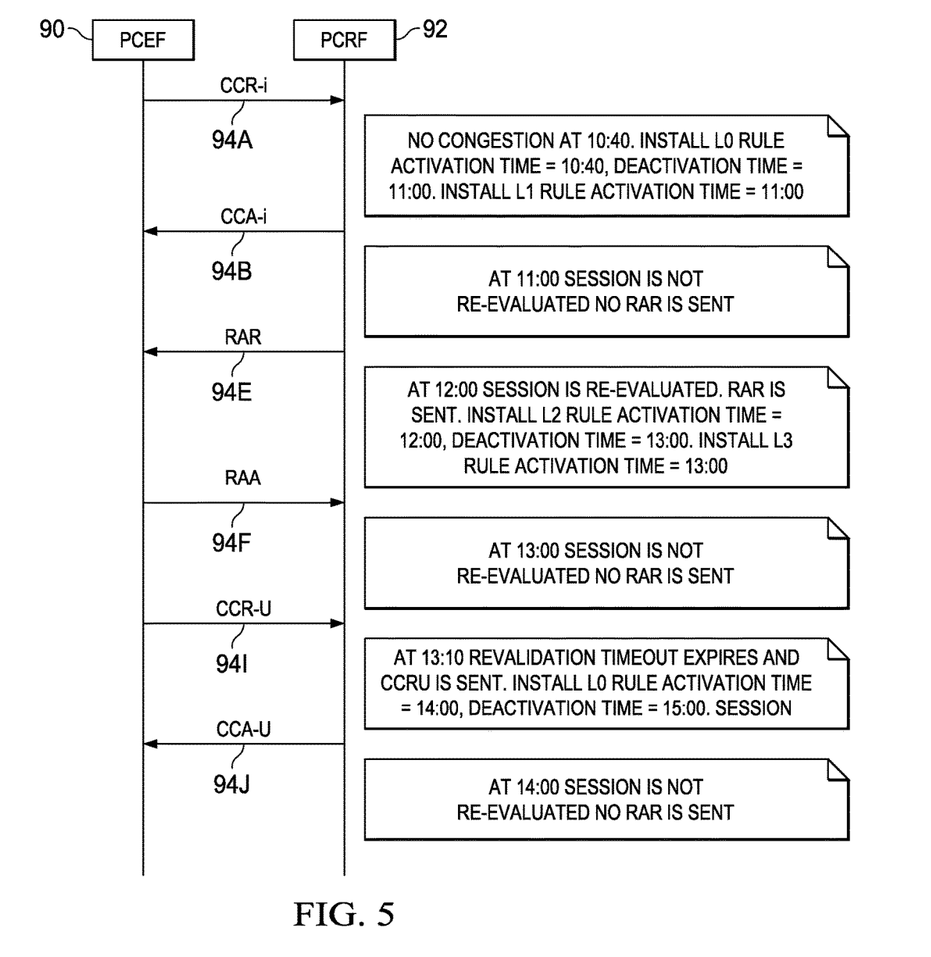
FIG. 5 is a flow diagram illustrating an alternative example flow of messages over a Gx interface between a PCEF and a PCRF in accordance with embodiments described herein to implement a technique for reducing reauthorization request ("RAR") messages in a mobile communications network environment.

FIG. 5 is a flow diagram illustrating the flow of messages between a PCEF 90 and a PCRF 92 in accordance with embodiments described herein for implementing a technique for reducing RAR messages in communications networks in which a revalidation timeout is deployed. Referring to FIG. 5, upon creation of the session at 10:40, a revalidation timer maintained by the PCEF 90 is set to 2.5 hours and a CCR message ("CCR-I") is sent from PCEF 90 to PCRF 92, as represented by an arrow 94A. PCRF 92 evaluates the session and determines that the session is currently experiencing no congestion (level 0 congestion), but that based on historical data maintained in a database accessible by the PCRF, the session is likely to experience level 1 congestion at the next hour boundary (11:00). As a result of the evaluation, the PCRF 92 returns a CCA ("CCA-I") message to PCEF 90 with instructions to install rule L0 (no congestion) with an activation time of 10:40 and a deactivation time of 11:00 and to install a rule L1 (level 1 congestion) with an activation time of 11:00, as represented in FIG. 5 by an arrow 94B.

At the next hour boundary (11:00), the session is not reevaluated and no message is sent, as discussed above with reference to FIG. 4. As previously noted, this is in contrast to the example illustrated in FIG. 3, in which at 11:00, an RAR message is sent from PCRF 72 to PCEF 70, as represented in FIG. 3 by an arrow 74C. At the PCEF 90, rule L0 is deactivated and rule L1 is activated as per the CCA-I message. At the next hour boundary (12:00), PCRF 92 again reevaluates the session and determines that the session is currently experiencing level 2 congestion and that based on historical data maintained in a database accessible by the PCRF, the session is likely to experience level 3 congestion at the next hour boundary (13:00). Once the evaluation is complete, PCRF 92 sends an RAR message to PCEF 90 instructing PCEF to install rule L2 (level 2 congestion) with an activation time of 12:00 and a deactivation time of 13:00, and to install rule L3 (level 3 congestion) with an activation time of 13:00, as represented in FIG. 5 by an arrow 94E. PCEF 90 deactivates rule L1 and activates rule L2 and responds with an RAA message, as represented in FIG. 5 by an arrow 94F.

It should be noted that if the evaluation reveals that the following hour's congestion is predicted to be the same as the current hour's connection, a single rule with a deactivation time two hours after the activation time will be sent in the RAR. In particular, using the current example, if the evaluation revealed that the session is likely to continue to experience level 2 congestion at the 13:00 hour boundary, the RAR message sent to PCEF 90 (as represented by arrow 94E) would instruct PCEF to install rule L2 with an activation time of 12:00 and a deactivation time of 14:00. Alternatively, no deactivation time may be provided, as a new RAR will presumably be sent at the 14:00 hour boundary, resulting in deactivation of rule L2.

In either case, at the next hour boundary (13:00), the session is not reevaluated and no RAR message is sent, as discussed above with reference to FIG. 4. Again, this is in direct contrast to the example illustrated in FIG. 3, in which at 13:00 an RAR message is sent from PCRF 72 to PCEF 70, as represented in FIG. 3 by an arrow 74G. At the PCEF 90, rule L2 is deactivated and rule L3 is activated.

Upon expiry of the revalidation timer at 13:10, the PCEF 90 sends a CCR-U message to the PCRF 92 to notify the PCRF of the time-out, as represented in FIG. 5 by an arrow 94I. Upon receipt of the CCR-U message, the PCRF 92 evaluates the congestion level (which in the current example, it determines to be level 0) and sends CCA-U message with instructions to install rule L0 with an activation time of 14:00 and a deactivation time of 15:00, as represented in FIG. 5 by an arrow 94J. At the next hour boundary (14:00) the session is not reevaluated and no RAR message is sent.

It will be noted that, although the examples illustrated in FIGS. 4 and 5 involve two rules (with activation and deactivation times, as appropriate) being included in an RAR message for installation on the PCEF, each RAR message may in fact include more than two such rules as desired. For example, in the scenario described above with reference to FIG. 4, the RAR message sent at 12:00 may instruct the PCEF to install rule L2 with activation time 12:00 and deactivation time 13:00, install rule L3 with an activation time of 13:00 and a deactivation time of 14:00, and install rule L0 with an activation time of 14:00.

Figure 6A:
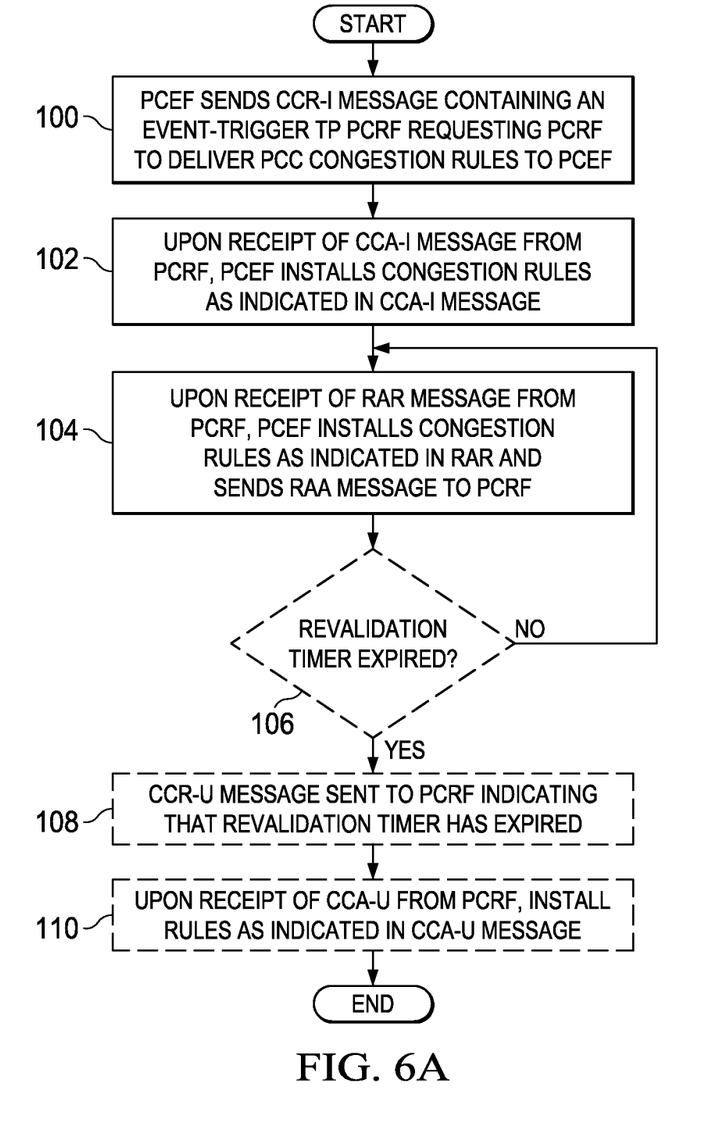
FIG. 6A is a flow chart illustrating example operations performed by a PCEF in implementing a technique for reducing a number of RAR messages in a mobile communications system in accordance with embodiments described herein.

Referring now to FIG. 6A, illustrated therein is a flowchart illustrating example operations performed by a PCEF in accordance with embodiments herein for implementing techniques for reducing RAR messages in communications networks. In step 100, the PCEF sends a CCR-I message containing an event-trigger to the PCRF requesting the PCRF to deliver PCC rules comprising congestion rules to the PCEF. In step 102, upon receipt of a CCA-I message from the PCRF, the PCEF installs congestion rules as indicated in the CCA-I message. In step 104, upon receipt of an RAR message from the PCRF, the PCEF installs the congestion rules as indicated in the RAR message and sends an RAA message to the PCRF. In optional step 106, which is implemented in use cases in which a revalidation timer is deployed, a determination is made whether the revalidation timer has expired. If not, execution returns to step 102; otherwise, execution proceeds to step 108. In step 108, a CCR-U message is sent to the PCRF indicating that the revalidation timer has expired. In step 110, upon receipt from the PCRF of a CCA-U message, the PCEF installs congestion rules as indicated in the CCA-U message. As previously noted, in accordance with embodiments described herein, at least two rules (one for the immediately succeeding hour and one for the hour after that) are provided in one or more of the CCA-I message, each of the RAR messages, and the CCA-U message. Additionally, at least the first rule included in the message may associated therewith an activation time and a deactivation time, whereas a last rule may have associated therewith only an activation time.

Figure 6B:
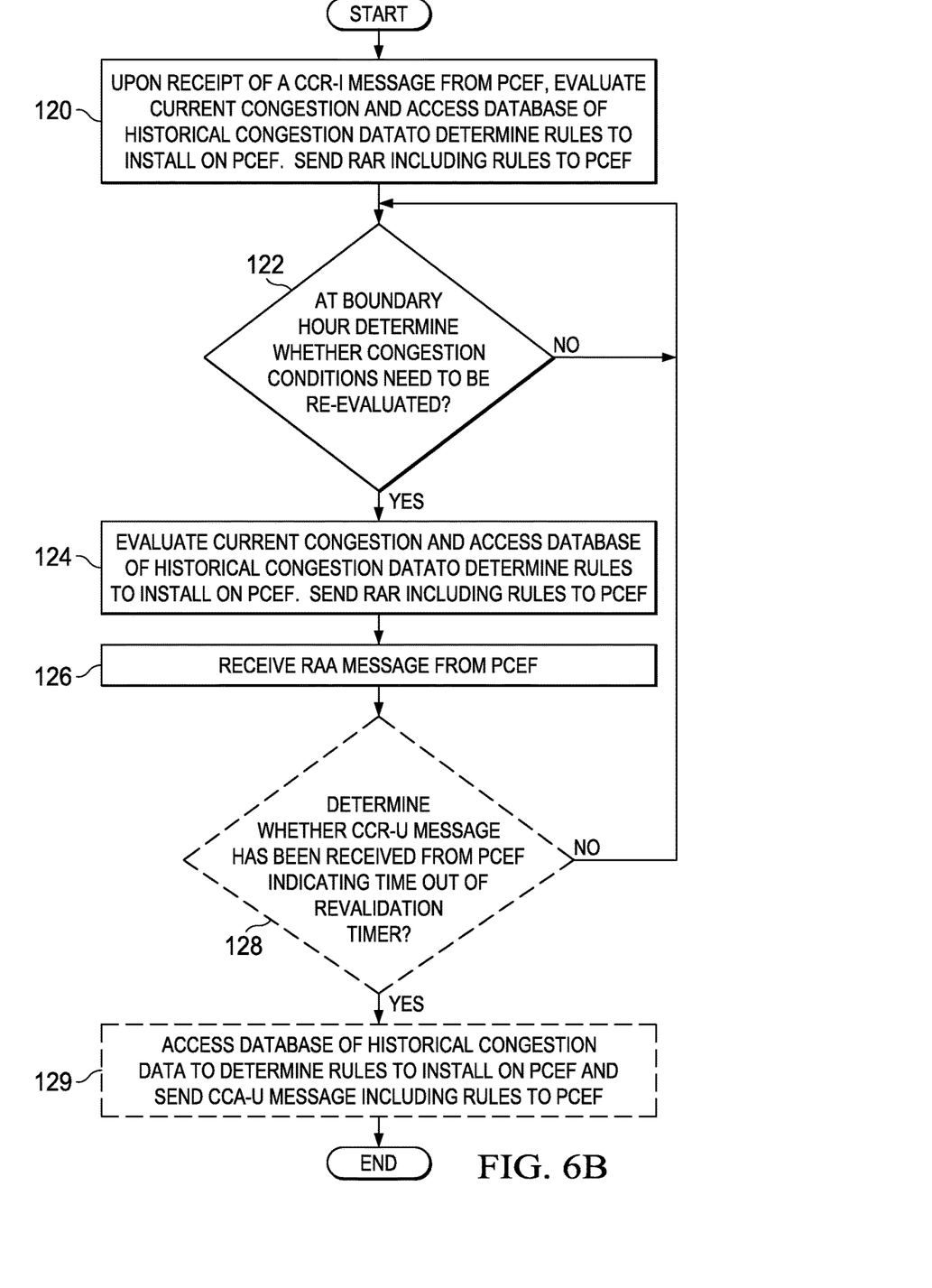
FIG. 6B is a flow chart illustrating example operations performed by a PCRF in implementing a technique for reducing a number of RAR messages in a mobile communications system in accordance with embodiments described herein.

Referring now to FIG. 6B, illustrated therein is a flowchart illustrating example operations performed by a PCRF in accordance with embodiments herein for implementing techniques for reducing RAR messages in communications networks. In step 120, upon receipt of a CCR-I message from the PCEF containing an event-trigger and requesting the PCRF to deliver PCC rules comprising congestion rules to the PCEF, the PCRF evaluates current congestion conditions and refers to a database of historical congestion data to determine a predicted congestion condition at at least the next hour boundary and sends to the PCEF a CCA-I message including congestion rules (each of which may have associated therewith an activation time and a deactivation time) to be installed on the PCEF based on the evaluating and determining. As noted above, if the predicted congestion condition at the next hour boundary is the same as the current congestion level, a single rule may be installed, wherein the rule is active for more than one hour. An RAR including the rules determined in this step is then forwarded to the PCEF. In step 122, a determination is made whether congestion conditions need to be reevaluated. It will be recognized that in certain embodiments, as described herein, reevaluation will not be necessary until the hour boundary immediately after the latest activation time specified by the most recent set of rules. For example, if the activation times of the rules are 10:00 and 11:00, respectively, then congestion conditions will not need to be reevaluated until 12:00. If a negative determination is made in step 122, execution remains at step 122 until a positive determination is made. Once a positive determination is made in step 122, execution proceeds to step 124. In step 124, the PCRF evaluates current congestion conditions and refers to a database of historical congestion data to determine a predicted congestion condition at at least the next hour boundary and sends to the PCEF an RAR message including congestion rules (each of which may have associated therewith an activation time and a deactivation time) to be installed on the PCEF based on the evaluating and determining. An RAR including the rules determined in this step is forwarded to the PCEF. In step 126, the PCRF may receive an RAA message from the PCEF.

In step 128, a determination is made whether a CCR-U message has been received from the PCEF indicating that the revalidation timer has timed out. If so, execution proceeds to step 129, in which the PCRF refers to a database of historical congestion data to determine a predicted congestion condition at at least the next hour boundary and sends to the PCEF a CCA-U message including congestion rules (each of which may have associated therewith an activation time and a deactivation time) to be installed on the PCEF based on the evaluating and determining. If a negative determination is made in step 129, execution returns to step 124.

In one example implementation, various network nodes, and particularly the PCRF and PCEF described herein, can include software for achieving the described functions. For example, referring to FIG. 7, one or more such network nodes for implementing the embodiments described herein, represented in FIG. 7 by a PCEF node 130 and a PCRF node 132, may include a respective RAR modules 134, 136, each of which comprises software embodied in one or more tangible media for facilitating the activities described herein. In particular, the PCEF RAR module 134 comprises software for facilitating the processes illustrated in and described with reference to FIGS. 3-5 and 6A. The PCRF RAR module 136 comprises software for facilitating the processes illustrated in and described with reference to FIGS. 3-5 and 6B. Each of the nodes 130, 132, may also include a memory device 138, 140, for storing information to be used in achieving the functions as outlined herein. Additionally, each of the nodes 130, 132, may include a processor 142, 144, that is capable of executing software or an algorithm (such as embodied in modules 134, 136, respectively) to perform the functions as discussed in this Specification. Additionally, each of the nodes 130, 132 may include various I/O devices, drivers, and interfaces, represented in FIG. 7 by I/O 146, 148, respectively.

Figure 7:
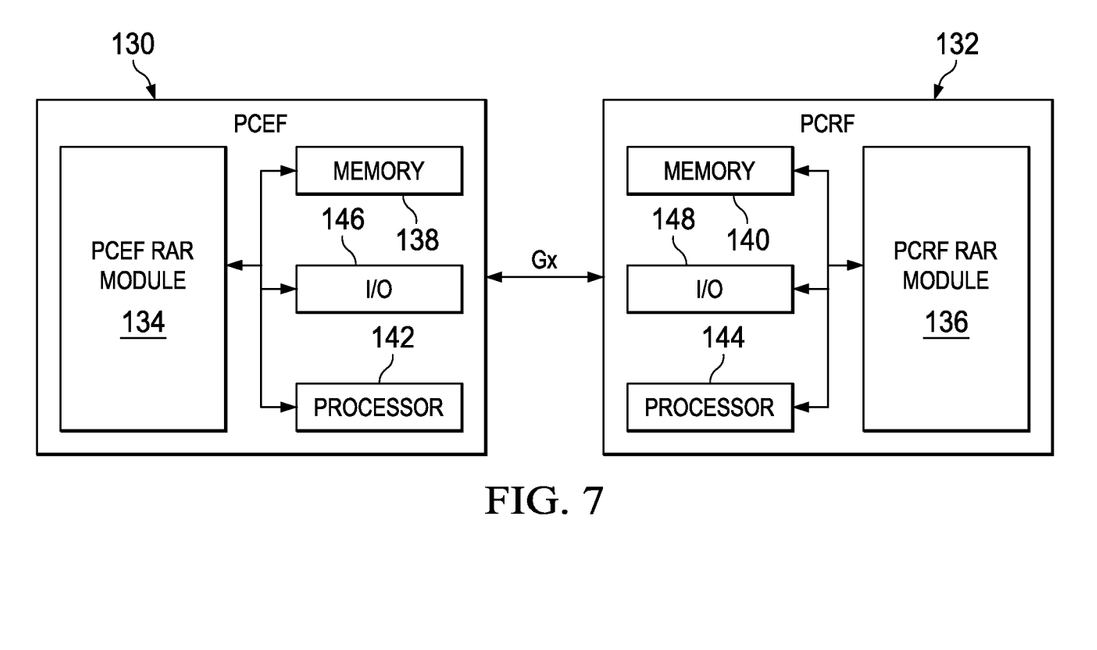
FIG. 7 is a block diagram illustrating PCEF and PCRF network nodes for implementing a technique for reducing the number of RAR messages sent in a mobile communications environment in accordance with embodiments described herein.

Although the examples are described with reference to a cellular telecommunications network, it will be recognized that the techniques are equally applicable to other network technologies. In one example implementation, various devices involved in implementing the embodiments described herein can include software for achieving the described functions. For example, as shown in FIG. 7, the nodes may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIGS. 3-6B. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 3-6B may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 3-6B. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   evaluating by a first network node a current level of congestion experienced by a session in a communications network;
   predicting a level of congestion that will be experienced by the session beginning at a next time boundary;
   sending a request message to a second network node, the request message comprising at least one rule corresponding to the current level of congestion and the predicted level of congestion, wherein the rule has associated therewith an activation time and a deactivation time; and
   refraining from sending an additional request message to the second network node at the next time boundary;
   wherein if the current congestion level and the predicted congestion level are the same, the at least one rule comprises a single rule and wherein a deactivation time associated with the single rule is two time periods after the activation time thereof;
   wherein if the current congestion level and the predicted congestion level are different, the at least one rule comprises two rules, and wherein a deactivation time of a first rule of the two rules is the same as an activation time of a second rule of the two rules.

2. The method of claim 1 further comprising receiving from the second network node an answer message indicating that the at least one rule has been installed on the second network node.

3. The method of claim 1, further comprising:
   determining whether a request update message has been received from the second network node indicating that a revalidation timer maintained at the second network node has timed out;
   if a request update message has been received from the second network node indicating that a revalidation timer maintained at the second network node has timed out:
      evaluating a new current level of congestion experienced by the session;
      predicting a new level of congestion that will be experienced by the session beginning at a next time boundary;
      sending an answer update message to the second network node, the answer update message comprising at least one new rule corresponding to the new current level of congestion and the new predicted level of congestion, wherein the new rule has associated therewith an activation time and a deactivation time; and
      refraining from sending an additional request message to the second network node at the next time boundary.

4. The method of claim 1, wherein the predicting further comprises accessing a database comprising historical congestion information data for the communications network.

5. The method of claim 1, wherein the first network node comprises a Policy Charging Rule Function ("PCRF") node and the second network node comprises a Policy Charging Enforcement Function ("PCEF") node.

6. The method of claim 1, wherein the at least one rule comprises a Policy and Charging Control ("PCC") rule.

7. One or more non-transitory tangible media that includes code for execution and when executed by a processor is operable to perform operations comprising:
   evaluating by a first network node a current level of congestion experienced by a session in a communications network;
   predicting a level of congestion that will be experienced by the session beginning at a next time boundary;
   sending a request message to a second network node, the request message comprising at least one rule corresponding to the current level of congestion and the predicted level of congestion, wherein the rule has associated therewith an activation time and a deactivation time; and refraining from sending an additional request message to the second network node at the next time boundary;

wherein if the current congestion level and the predicted congestion level are the same, the at least one rule comprises a single rule and wherein a deactivation time associated with the single rule is two time periods after the activation time thereof;

wherein if the current congestion level and the predicted congestion level are different, the at least one rule comprises two rules, and wherein a deactivation time of a first rule of the two rules is the same as an activation time of a second rule of the two rules.

8. The media of claim 7, wherein the operations further comprise receiving from the second network node an answer message indicating that the at least one rule has been installed on the second network node.

9. The media of claim 7, wherein the operations further comprise:
   determining whether a request update message has been received from the second network node indicating that a revalidation timer maintained at the second network node has timed out;
   if a request update message has been received from the second network node indicating that a revalidation timer maintained at the second network node has timed out:
      evaluating a new current level of congestion experienced by the session;
      predicting a new level of congestion that will be experienced by the session beginning at a next time boundary;
      sending an answer update message to the second network node, the answer update message comprising at least one new rule corresponding to the new current level of congestion and the new predicted level of congestion, wherein the new rule has associated therewith an activation time and a deactivation time; and
      refraining from sending an additional request message to the second network node at the next time boundary.

10. The media of claim 7, wherein the predicting further comprises accessing a database comprising historical congestion information data for the communications network.

11. An apparatus comprising: a memory element configured to store data; and
   a processor operable to execute instructions associated with the data; wherein the apparatus is configured to:
   evaluate a current level of congestion experienced by a session in a communications network;
   predict a level of congestion that will be experienced by the session beginning at a next time boundary;
   send a request message to a network node, the request message comprising at least one rule corresponding to the current level of congestion and the predicted level of congestion, wherein the rule has associated therewith an activation time and a deactivation time; and
   refrain from sending an additional request message to the network node at the next time boundary;
   wherein if the current congestion level and the predicted congestion level are the same, the at least one rule comprises a single rule and wherein a deactivation time associated with the single rule is two time periods after the activation time thereof;
   wherein if the current congestion level and the predicted congestion level are different, the at least one rule comprises two rules, and wherein a deactivation time of a first rule of the two rules is the same as an activation time of a second rule of the two rules.

12. The apparatus of claim 11, wherein the apparatus is further configured to receive from the network node an answer message indicating that the at least one rule has been installed on the network node.

13. The apparatus of claim 11, wherein the apparatus is further configured to:
   determine whether a request update message has been received from the network node indicating that a revalidation timer maintained at the network node has timed out;
   if a request update message has been received from the network node indicating that a revalidation timer maintained at the network node has timed out:
      evaluate a new current level of congestion experienced by the session;
      predict a new level of congestion that will be experienced by the session beginning at a next time boundary;
      send an answer update message to the network node, the answer update message comprising at least one new rule corresponding to the new current level of congestion and the new predicted level of congestion, wherein the new rule has associated therewith an activation time and a deactivation time; and
      refrain from sending an additional request message to the network node at the next time boundary.

14. The apparatus of claim 11, wherein the predicting further comprises accessing a database comprising historical congestion information data for the communications network.

15. The apparatus of claim 11, wherein the apparatus further comprises a Policy Charging Rule Function ("PCRF") node and the network node comprises a Policy Charging Enforcement Function ("PCEF") node.

* * * * *